United States Patent
Yokotsuji et al.

(10) Patent No.: US 9,837,686 B2
(45) Date of Patent: Dec. 5, 2017

(54) RECHARGEABLE LITHIUM ION BATTERY

(71) Applicant: Samsung SDI Co., Ltd., Yongin-si, Gyeonggi-do (KR)

(72) Inventors: Hokuto Yokotsuji, Yokohama (JP); Hironari Takase, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 86 days.

(21) Appl. No.: 14/534,094

(22) Filed: Nov. 5, 2014

(65) Prior Publication Data
US 2015/0125742 A1    May 7, 2015

(30) Foreign Application Priority Data

Nov. 7, 2013   (JP) .................................. 2013-231415
Aug. 20, 2014  (KR) ........................ 10-2014-0108480

(51) Int. Cl.
| | |
|---|---|
| *H01M 10/0567* | (2010.01) |
| *H01M 4/505* | (2010.01) |
| *H01M 4/525* | (2010.01) |
| *H01M 10/0525* | (2010.01) |

(52) U.S. Cl.
CPC ... *H01M 10/0567* (2013.01); *H01M 10/0525* (2013.01); *H01M 4/505* (2013.01); *H01M 4/525* (2013.01); *H01M 2300/0025* (2013.01)

(58) Field of Classification Search
CPC ....................... H01M 10/0567; H01M 10/0525
USPC ......................................................... 429/188
See application file for complete search history.

(56) References Cited

U.S. PATENT DOCUMENTS

| | | | |
|---|---|---|---|
| 8,053,109 B2 | 11/2011 | Iwanaga et al. | |
| 8,673,489 B2 | 3/2014 | Tokuda et al. | |
| 9,236,635 B2* | 1/2016 | Abe | ...................... C07C 309/65 |
| 2007/0154815 A1* | 7/2007 | Kawasaki | ............. H01M 4/131 |
| | | | 429/340 |
| 2013/0143129 A1* | 6/2013 | Okamoto | .......... H01M 10/0567 |
| | | | 429/338 |

(Continued)

FOREIGN PATENT DOCUMENTS

| | | |
|---|---|---|
| JP | 2004-139743 A | 5/2004 |
| KR | 10-2009-0050951 A | 5/2009 |
| KR | 10-2014-0007000 A | 1/2014 |

OTHER PUBLICATIONS

Patent Abstracts of Japan and Machine English Translation of JP 2004-139743 A, May 13, 2014, 14 Pages.

*Primary Examiner* — Osei Amponsah
(74) *Attorney, Agent, or Firm* — Lewis Roca Rothgerber Christie LLP

(57) ABSTRACT

The rechargeable lithium ion battery includes a positive active material including a lithium compound, a non-aqueous electrolyte including at least one disulfonate ester selected from a cyclic disulfonate ester represented by Chemical Formula 1 and a linear disulfonate ester represented by Chemical Formula 2, and includes at least one carbonate having an unsaturated bond selected from vinylene carbonate and vinylethylene carbonate. The non-aqueous electrolyte may include about 0.05 wt % to about 0.5 wt % of the disulfonate ester based on the total weight of the non-aqueous electrolyte, and about 0.2 wt % to about 1.5 wt % of the carbonate having the unsaturated bond based on the total weight of the non-aqueous electrolyte.

8 Claims, 1 Drawing Sheet

(56) References Cited

U.S. PATENT DOCUMENTS

2016/0049691 A1* 2/2016 Suzuki .................. H01M 4/505
                                                              429/163

* cited by examiner

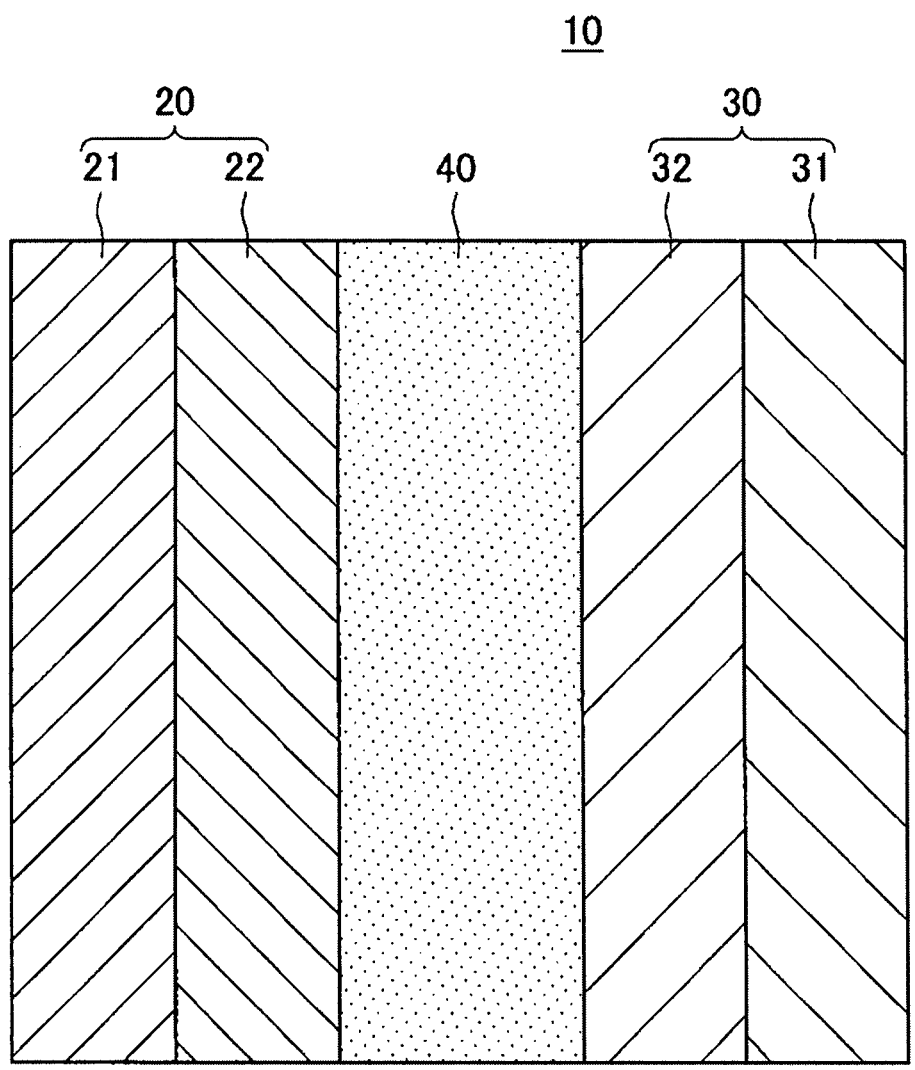

RECHARGEABLE LITHIUM ION BATTERY

CROSS-REFERENCE TO RELATED APPLICATIONS

This application claims priority to and the benefit of Japanese Patent Application No. 2013-231415 filed in the Japanese Patent Office on Nov. 7, 2013, and Korean Patent Application No. 10-2014-0108480 filed in the Korean Intellectual Property Office on Aug. 20, 2014, the entire contents of each of which are incorporated herein by reference.

BACKGROUND

1. Field

A rechargeable lithium ion battery is disclosed.

2. Description of the Related Art

Recently, a lithium nickel composite oxide has been suggested as a positive active material capable of realizing a high potential and high capacity in a rechargeable lithium ion battery. However, when a rechargeable lithium ion battery using the lithium nickel composite oxide as a positive active material is stored at a high temperature in a full-charge state, there is a problem of generating a large amount of gas and deteriorating battery characteristics.

Although improving thermal stability of the lithium nickel composite oxide at a high temperature by adding cyclic carbonate having an unsaturated bond to an electrolyte solution has been attempted, that technology has a problem of increasing internal resistance of the rechargeable lithium ion battery and deteriorating its battery characteristics such as power and the like.

SUMMARY

One embodiment of the present invention is directed toward providing a novel and improved rechargeable lithium ion battery having improved thermal stability and battery characteristics when being stored at high temperature.

According to an exemplary embodiment, a rechargeable lithium ion battery includes a positive active material including a lithium compound; and a non-aqueous electrolyte including at least one disulfonate ester selected from a cyclic disulfonate ester represented by Chemical Formula 1 and a linear disulfonate ester represented by Chemical Formula 2, and at least one carbonate having an unsaturated bond selected from vinylene carbonate and vinylethylene carbonate.

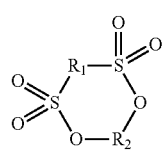

Chemical Formula 1

In the above Chemical Formula 1, $R_1$ and $R_2$ are each independently selected from a substituted or unsubstituted C1 to C5 alkylene group and a substituted or unsubstituted C1 to C5 fluoro alkylene group.

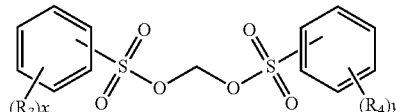

Chemical Formula 2

In the above Chemical Formula 2, $R_3$ and $R_4$ are each independently selected from a substituted or unsubstituted C1 to C4 alkyl group and a substituted or unsubstituted C1 to C4 fluoro alkyl group, and x and y are each independently integers of 0 to 5.

The non-aqueous electrolyte may further include an imide lithium salt represented by Chemical Formula 3.

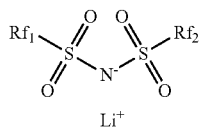

Chemical Formula 3

In the above Chemical Formula 3, $Rf_1$ and $Rf_2$ are each independently selected from fluorine and a C1 to C4 fluoro alkyl group.

In the above Chemical Formulae 1 and 2, $R_1$ and $R_2$ are each independently a substituted or unsubstituted C1 to C2 alkylene group, $R_3$ and $R_4$ are each independently selected from a substituted or unsubstituted methyl group and a substituted or unsubstituted fluoro methyl group, and x and y are each independently integers of 1 to 3.

In the above Chemical Formula 3, $Rf_1$ and $Rf_2$ may each be fluorine.

The non-aqueous electrolyte may include about 0.05 wt % to about 0.5 wt % of the disulfonate ester based on the total weight of the non-aqueous electrolyte, and about 0.2 wt % to about 1.5 wt % of the carbonate having the unsaturated bond based on the total weight of the non-aqueous electrolyte.

The lithium compound may be represented by Chemical Formula 4.

$$Li_aX_bY_{1-b}O_2 \quad \text{Chemical Formula 4}$$

In Chemical Formula 4,

X is selected from Ni, Co, Mn, and a combination thereof,

Y is selected from Al, Ni, Co, Mn, Cr, Fe, Mg, Sr, V, a rare earth element and a combination thereof, and

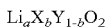

0.90≤a≤1.8 and 0≤b≤0.9.

The lithium compound may be represented by Chemical Formula 5.

$$Li_aNi_bM_{1-b}O_2 \quad \text{Chemical Formula 5}$$

In the Chemical Formula 5,

M is selected from Co, Mn, and a combination thereof, and

0.90≤a≤1.8 and 0≤b≤0.9.

The rechargeable lithium ion battery according to one embodiment may ensure thermal stability when being stored at a high temperature and may have excellent battery characteristics.

BRIEF DESCRIPTION OF THE DRAWING

The accompanying drawing, together with the specification, illustrate embodiments of the present invention, and, together with the description, serve to explain the principles of the present invention. The accompanying drawing is a cross-sectional view showing the structure of a rechargeable lithium ion battery according to one embodiment.

DETAILED DESCRIPTION

Hereinafter, referring to the accompanying drawing, embodiments of the present invention are described. On the other hand, constituent elements functioning in substantially the same manner as one another in the present specification and drawing are assigned with the same numbers and thus, illustrations thereof will not be repeated.

As used herein, when a definition is not otherwise provided, the term 'substituted' refers to one substituted with a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, in place of a hydrogen atom of a compound.

As used herein, when a definition is not otherwise provided, the term 'hetero' refers to one including 1 to 3 heteroatoms selected from N, O, S and P. Also, in the context of the present application, when a first element is referred to as being "on" a second element, it can be directly on the second element or be indirectly on the second element with one or more intervening elements interposed therebetween. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, a rechargeable lithium ion battery according to an exemplary embodiment is described.

1. Rechargeable Lithium Ion Battery According to an Exemplary Embodiment

A rechargeable lithium ion battery according to an exemplary embodiment includes a lithium nickel composite oxide as a positive active material. The rechargeable lithium ion battery using lithium nickel composite oxide as a positive active material may realize a high potential and high discharge capacity, but when stored at a high temperature in a full-charge state, a large amount of gas may be generated, and its battery characteristics may be deteriorated.

Since the rechargeable lithium ion battery using the lithium nickel composite oxide as a positive active material has high energy density, it is beneficial to solve the problems associated with storage at a high temperature.

A rechargeable lithium ion battery according to an exemplary embodiment of the present invention may suppress (or reduce) gas generation, capacity decrease and resistance increase when being stored at a high temperature and, thus, an embodiment of the present invention may solve the problems associated with high temperature storage of a rechargeable lithium battery including a lithium nickel composite oxide as a positive active material.

A rechargeable lithium ion battery according to an exemplary embodiment includes a non-aqueous electrolyte including a disulfonate ester and a carbonate having an unsaturated bond.

Herein, the disulfonate ester may be, for example, at least one disulfonate ester selected from a cyclic disulfonate ester represented by the following Chemical Formula 1 and a linear disulfonate ester represented by the following Chemical Formula 2, but the disulfonate ester is not limited thereto.

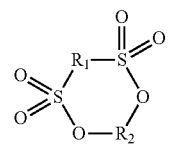

Chemical Formula 1

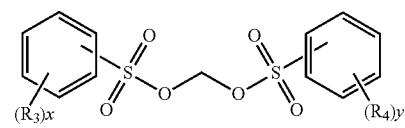

Chemical Formula 2

In the above Chemical Formulae 1 and 2, $R_1$ and $R_2$ are each independently selected from a substituted or unsubstituted C1 to C5 alkylene group and a substituted or unsubstituted C1 to C5 fluoro alkylene group, $R_3$ and $R_4$ are each independently selected from a substituted or unsubstituted C1 to C4 alkyl group and a substituted or unsubstituted C1 to C4 fluoro alkyl group, and x and y are each independently integers of 0 to 5.

The carbonate having an unsaturated bond may be, for example, at least one carbonate selected from vinylene carbonate and vinylethylene carbonate, but the carbonate is not limited thereto.

The disulfonate ester and carbonate having an unsaturated bond may be used as a mixture of two or more. For example, the non-aqueous electrolyte may include two or more of the disulfonate ester and/or two or more of the carbonate.

The rechargeable lithium ion battery according to an exemplary embodiment includes the disulfonate ester and the carbonate having an unsaturated bond in a non-aqueous electrolyte, and thereby suppresses (or reduces) gas generation, capacity decrease and resistance increase when being stored at a high temperature. Therefore, the rechargeable lithium ion battery according to an exemplary embodiment may improve thermal stability and battery characteristics when being stored at a high temperature.

The rechargeable lithium ion battery according to an exemplary embodiment includes a positive active material including a lithium compound. For example, the lithium compound may be represented by the following Chemical Formula 4.

$$Li_aX_bY_{1-b}O_2 \qquad \text{Chemical Formula 4}$$

In Chemical Formula 4:

X is selected from Ni, Co, Mn, and a combination thereof,

Y is selected from Al, Ni, Co, Mn, Cr, Fe, Mg, Sr, V, a rare earth element and a combination thereof, and $$0.90 \leq a \leq 1.8 \text{ and } 0 \leq b \leq 0.9.$$

The lithium compound may be, for example, represented by Chemical Formula 5.

$$Li_aNi_bM_{1-b}O_2 \qquad \text{Chemical Formula 5}$$

In Chemical Formula 5:

M is at least one metal except Ni (e.g., M is selected from Co, Mn, and a combination thereof), and $$0.90 \leq a \leq 1.8 \text{ and } 0 \leq b \leq 0.9.$$

In the Chemical Formulae 4 and 5, a may be, for example $1.0 \leq a \leq 1.6$, $1.0 \leq a \leq 1.4$ or $1.0 \leq a \leq 1.2$.

2. Structure of Rechargeable Lithium Ion Battery

Hereinafter, referring to the accompanying drawing, a structure of the rechargeable lithium ion battery 10 according to an exemplary embodiment is described.

The accompanying drawing is a cross-sectional view showing a structure of a rechargeable lithium ion battery according to one embodiment.

As shown in the accompanying drawing, the rechargeable lithium ion battery 10 includes a lithium nickel composite oxide as a positive active material, and includes a positive electrode 20, a negative electrode 30, and a separator layer 40.

The rechargeable lithium ion battery 10 is not particularly limited in shape. For example, the rechargeable lithium ion battery 10 may have any suitable shape such as a cylinder, a prism, a laminate type (or kind), a button type (or kind) and/or the like, but the shape is not limited thereto.

The positive electrode 20 includes a current collector 21 and a positive active material layer 22. The current collector 21 may be any suitable conductor, for example, aluminum, stainless steel and/or nickel-plated steel, but the current collector is not limited thereto.

The positive active material layer 22 includes at least the positive active material and a conductive material, and may further include a binder. The contents of the positive active material, conductive material and binder are not particularly limited, and may each be any suitable one that is applied in the art of rechargeable lithium ion batteries.

The positive active material may include the lithium nickel composite oxide represented by the above Chemical Formula 4.

The rechargeable lithium ion battery according to an exemplary embodiment suppresses (or reduces) gas generation, capacity decrease and resistance increase when being stored at a high temperature. Accordingly, the lithium nickel composite oxide having the composition having high energy density but requiring improvement of thermal stability and electrical characteristics during storage at a high temperature may be used as a positive active material.

The conductive material may be, for example, carbon black such as ketjen black, acetylene black, and/or the like, natural graphite, artificial graphite, and/or the like. However, the conductive material may be any suitable one without limitation that improves conductivity of a positive electrode.

The binder may be, for example, polyvinylidene fluoride, an ethylene-propylene-diene terpolymer, a styrene-butadiene rubber, an acrylonitrile-butadiene rubber, fluororubber, polyvinyl acetate, polymethyl methacrylate, polyethylene, nitrocellulose, and/or the like. But the binder may not be particularly limited if it suitably binds the positive active material and the conductive material on the current collector 21.

In some embodiments, the positive active material layer 22 is formed by dispersing a positive active material, a conductive material and a binder into an appropriate organic solvent (for example, N-methyl-2-pyrrolidone) to prepare slurry, coating the slurry on a current collector 21, and then, drying and compressing it.

The negative electrode 30 includes a current collector 31 and a negative active material layer 32. The current collector 31 may be any suitable conductor, for example, aluminum, stainless steel and/or nickel-plated steel, but the current collector is not limited thereto.

The negative active material layer 32 includes a negative active material, and may further include a binder. The negative active material may be, for example, a graphite active material (artificial graphite, natural graphite, a mixture of artificial graphite and natural graphite, natural graphite coated with artificial graphite, and the like), a mixture of a particulate of silicon (Si) or tin (Sn) or oxides thereof and a graphite active material, a silicon or tin particulate, an alloy including silicon or tin as a basic material, and titanium oxide ($TiO_x$) compound such as $Li_4Ti_5O_{12}$ and/or the like, but the negative active material is not limited thereto. The silicon oxide may be represented by $SiO_x$ ($0 \leq x \leq 2$). In addition to, or instead of, the above-identified materials, the negative active material may be, for example metal lithium and the like.

The binder may be the same or substantially the same as the binder of the positive active material layer 22, but the binder is not limited thereto. A weight ratio of the negative active material and the binder is not particularly limited, and may be any suitable one that may be adopted in the art of rechargeable lithium ion batteries.

The separator layer 40 includes a separator 41 and an electrolyte 43.

The separator 41 is not particularly limited, and may be any suitable separator usable in a rechargeable lithium ion battery. For example, the separator 41 may be a porous film or a non-woven fabric having excellent high rate discharge performance that may be used singularly or with other materials.

The separator may be coated with an inorganic material such as $Al_2O_3$, $SiO_2$ and/or the like, or may include the above inorganic materials as a filler. The materials of the separator may be, for example, a polyolefin-based resin such as polyethylene, polypropylene, and/or the like, a polyester-based resin such as polyethylene terephthalate, polybutylene terephthalate, and/or the like, a polyvinylidene difluoride, vinylidene fluoride-hexafluoro propylene copolymer, a vinylidene fluoride-perfluoro vinylether copolymer, a vinylidene fluoride-tetrafluoroethylene copolymer, a vinylidene fluoride-trifluoro ethylene copolymer, a vinylidene fluoride-fluoro ethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, and/or the like. The porosity of the separator is not particularly limited, and may be any suitable porosity available for a separator in the art of rechargeable lithium ion batteries.

In some embodiments, the electrolyte 43 includes a lithium salt, solvent, a first additive of the disulfonate ester and a second additive of the carbonate having the unsaturated bond.

The lithium salt is an electrolyte of the electrolyte 43. The lithium salt may be, for example, $LIPF_6$, $LiClO_4$, $LiBF_4$, $LiAsF_6$, $LiSbF_6$, $LiSO_3CF_3$, $LiC(SO_2CF_2CF_3)_3$, $LiC(SO_2CF_3)_3$, $LiI$, $LiCl$, $LiF$, $LiPF_5(SO_2CF_3)$, $LiPF_4(SO_2CF_3)_2$, and/or the like. The foregoing lithium salts may be used singularly or as a mixture of two or more. The concentration of the lithium salt is not particularly limited, but it may be, for example, at a concentration of about 0.5 mol/L to about 2.0 mol/L in the electrolyte 43.

In some embodiments, the solvent is a non-aqueous solvent which the lithium salt and additives dissolve in. The solvent may be, for example, cyclic carbonate esters such as propylene carbonate, ethylene carbonate, butylene carbonate, chloroethylene carbonate, and/or the like; cyclic esters such as γ-butyrolactone, γ-valero lactone and/or the like; linear carbonates such as dimethyl carbonate, diethylcarbonate, ethylmethyl carbonate, and/or the like; linear esters such as methyl formate, methyl acetate, methyl butyrate, and/or the like; ethers such as tetrahydrofuran and/or a derivative thereof; ethers such as 1,3-dioxane, 1,4-dioxane, 1,2-dimethoxy ethane, 1,4-dibutoxyethane, methyl diglyme and/or the like; nitriles such as acetonitrile, benzonitrile, and/or the like; dioxolane and/or a derivative thereof; ethylene sulfide, sulfolane, sultone and/or a derivative thereof which may be used singularly or as a mixture of two or more, without limitation. When two or more of the solvent are mixed, a mixing ratio of each solvent may be a suitable mixing ratio that may be used in the art of rechargeable lithium ion batteries.

The first additive, the disulfonate ester, may be, for example, a cyclic disulfonate ester represented by the following Chemical Formula 1 and a linear disulfonate ester represented by the following Chemical Formula 2.

Chemical Formula 1

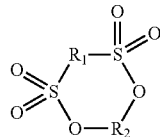

Chemical Formula 2

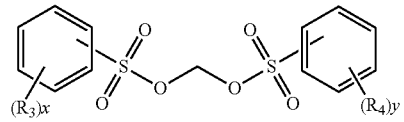

In the above Chemical Formulae 1 and 2, $R_1$ and $R_2$ are each independently selected from a substituted or unsubstituted C1 to C5 alkylene group and a substituted or unsubstituted C1 to C5 fluoro alkylene group, $R_3$ and $R_4$ are each independently selected from a substituted or unsubstituted C1 to C4 alkyl group and a substituted or unsubstituted C1 to C4 fluoro alkyl group, and x and y are each independently integers of 0 to 5.

For example, the first additive may be a disulfonate ester where, in the above Chemical Formulae 1 and 2 of, $R_1$ and $R_2$ may be each independently a substituted or unsubstituted C1 to C2 alkylene group, $R_3$ and $R_4$ may be each independently selected from a substituted or unsubstituted methyl group and a substituted or unsubstituted fluoro methyl group, and x and y are each independently integers of 1 to 3.

In addition, the disulfonate ester of the first additive may be, for example, at least one of the compounds represented by Chemical Formulas 1a, 1b, 2a, 2b, 2c, and 2d.

Chemical Formula 1a:

Compound 11

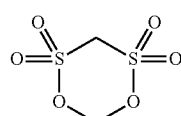

Chemical Formula 1b:

Compound 12

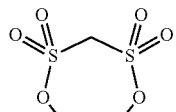

Chemical Formula 2a:

Compound 21

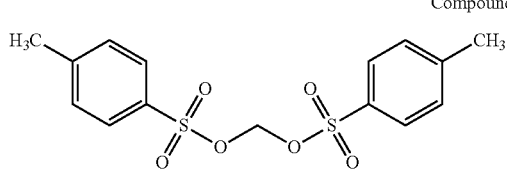

Chemical Formula 2b:

Compound 22

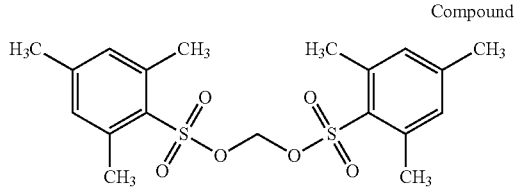

Chemical Formula 2c:

Compound 23

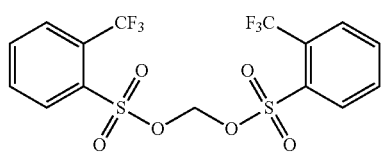

Chemical Formula 2d:

Compound 24

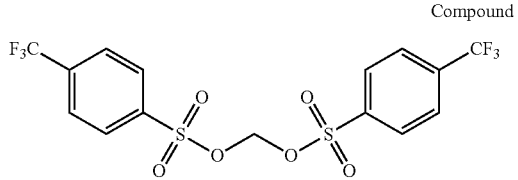

The second additive, the carbonate having the unsaturated bond, may be, for example, a cyclic carbonate having an unsaturated bond.

For example, the second additive may be vinylene carbonate or vinylethylene carbonate.

The rechargeable lithium ion battery according to an exemplary embodiment include both the first additive and the second additive in the electrolyte 43, and therefore, gas generation, capacity decrease and resistance increase when stored at a high temperature may be suppressed (or reduced) as evidenced in the below-described Examples. For example, when the electrolyte 43 includes the first additive but not the second additive, the gas generation amount is remarkably increased when the rechargeable lithium ion battery is stored at a high temperature. In addition, when the electrolyte 43 includes the second additive but not the first additive, a resistance increase ratio is increased when the rechargeable lithium ion battery is stored at a high temperature. In some embodiments, the disulfonate ester of the first additive is included in an amount of greater than or equal to about 0.05 wt % to less than or equal to about 0.5 wt % based on the total weight of the electrolyte 43.

As evidenced in the below-described Examples, when the first additive is included in the foregoing range, the rechargeable lithium ion battery may be suppressed (or reduced) from gas generation, capacity decrease and resistance increase when stored at a high temperature. For example, when the disulfonate ester is included at a concentration of less than about 0.05 wt %, a gas generation amount is increased when the rechargeable lithium ion battery is stored at high temperature, and in addition, a resistance increase ratio may be increased. On the other hand, when the disulfonate ester is included at a concentration of greater than about 0.5 wt %, a gas generation amount may be remarkably increased when the rechargeable lithium ion battery is stored at high temperature.

In addition, the second additive may be included at a concentration of greater than or equal to about 0.2 wt % to less than or equal to about 1.5 wt % based on the total weight of the electrolyte. As evidenced in the below-described Examples, when the second additive is included within the foregoing concentration range, gas generation, capacity decrease and resistance increase when the rechargeable lithium ion battery is stored at a high temperature may be suppressed (or reduced). For example, when the carbonate having the unsaturated bond is included at a concentration of less than about 0.2 wt %, a gas generation amount when the rechargeable lithium ion battery is stored at a high temperature may be remarkably increased. On the other hand, when the carbonate having the unsaturated bond is included in a concentration of greater than about 1.5 wt %, a gas generation amount and a resistance increase ratio may be increased when the rechargeable lithium ion battery is stored at high temperature.

The electrolyte 43 may further include a third additive, such as an imide lithium salt, but the electrolyte is not limited thereto.

The third additive, imide lithium salt may be, for example, an imide lithium salt represented by the following Chemical Formula 3, but the imide lithium salt is not limited thereto.

Chemical Formula 3

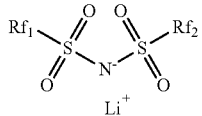

In the above Chemical Formula 3, $Rf_1$ and $Rf_2$ are each independently selected from fluorine and a C1 to C4 fluoro alkyl group. For example, $Rf_1$ and $Rf_2$ may each be fluorine, but $Rf_1$ and $Rf_2$ are not limited thereto.

For example, the third additive may be an imide lithium salt represented by Chemical Formula 3a.

Chemical Formula 3a:

Compound 31

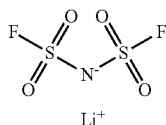

The rechargeable lithium ion battery according to an exemplary embodiment includes the third additive in the electrolyte, and therefore, as evidenced in the below-described Examples, gas generation, capacity decrease and resistance increase when stored at a high temperature may be further suppressed (or reduced). Herein, an adding concentration of the third additive is not particularly limited, and may be any suitable concentration usable for an additive of an electrolyte in the art of rechargeable lithium ion batteries. For example, the third additive may be included in an amount of about 0.5 wt % to about 2.0 wt % based on the total weight of the electrolyte 43. When the third additive is added at the above concentration in the electrolyte 43, a rechargeable lithium ion battery according to an exemplary embodiment may further suppress (or reduce) gas generation, capacity decrease and resistance increase when being stored at a high temperature.

The electrolyte 43 may further include various additives such as a negative electrode SEI (Solid Electrolyte Interface) forming agent, a surfactant and the like as well as the first and second additives (or the first to third additives). Such additives may be, for example, succinic anhydride, lithium bis(oxalate), lithium tetrafluoroborate, a dinitrile compound, propanesultone, butane sultone, propene sultone, 3-sulfolene, fluorinated allyl ether, fluorinated acrylate, and the like, but the additives are not limited thereto. The concentrations of the additives may be any suitable one that is used in the art of rechargeable lithium ion batteries.

3. Method of Manufacturing Rechargeable Lithium Ion Battery

Embodiments of a method of manufacturing a rechargeable lithium ion battery 10 are further described below.

In some embodiments, the positive electrode 20 is manufactured as follows.

First of all, a positive active material, a conductive material and a binder are mixed in a suitable or desired ratio, and the mixture is dispersed into an organic solvent (for example, N-methyl-2-pyrrolidone), to form a slurry. Then, the slurry is formed (for example, coated) on a current collector 21 and then, dried to form a positive active material layer 22. The coating may be performed by using, for example, a knife coater, a gravure coater, and/or the like, but the coating is not limited thereto. Each of the coating processes described below may be performed using the same or substantially the same methods as described above. In addition, the positive active material layer 22 is compressed to have a suitable or desired thickness by using a compressor. In this way, the positive electrode 20 is manufactured. Herein, a thickness of the positive active material layer 22 is not particularly limited, but instead may have any suitable thickness that a positive active material layer for a rechargeable lithium ion battery has.

The negative electrode 30 is manufactured in the same or substantially the same method as used for the positive electrode 20. For example, in some embodiments, the negative electrode 30 is manufactured as follows. First of all, a negative active material and a binder are mixed in a suitable or desired ratio, and the mixture is dispersed into an organic solvent (for example, N-methyl-2-pyrrolidone), to form a slurry. Then, the slurry is formed (for example, coated) on a current collector 31 and dried to form a negative active material layer 32. In addition, the negative active material layer 32 is compressed to have a suitable or desired thickness by using a compressor. In this way, the negative electrode 30 is manufactured. Herein, a thickness of the negative active material layer 32 is not particularly limited, but instead may have any suitable thickness that a negative active material layer for a rechargeable lithium ion battery has. In addition, when lithium metal is used as the negative active material layer 32, the lithium metal may be overlapped with the current collector 31.

The separator 41 is interposed between the positive electrode 20 and the negative electrode 30 to manufacture an electrode structure. In addition, the electrode structure is processed to have a suitable or desired shape (for example, a cylinder, a prism, a laminate type (or kind), a button type (or kind) and the like, but the shape is not limited thereto) and inserted into a container having the same or substantially the same shape. In addition, the electrolyte 43 including the disulfonate ester and the carbonate having the unsaturated bond as an additive is added to impregnate the pores in the separator 41 therewith. Accordingly, the rechargeable lithium ion battery cell 10 is manufactured.

EXAMPLE

Hereinafter, certain embodiments are illustrated with reference to examples. However, these examples are exemplary, and the present disclosure is not limited thereto.

Example 1

A rechargeable lithium ion battery cell according to Example 1 was manufactured according to the following method.

First of all, 98 parts by weight of $LiNi_{0.6}Co_{0.2}Mn_{0.2}O_2$, 1 part by weight of polyvinylidene fluoride and 1 part by weight of carbon black were dispersed into N-methyl-2-pyrrolidone, forming a slurry. Subsequently, the slurry was coated on an aluminum thin film current collector and dried to form a positive active material layer to manufacture a positive electrode.

Next, 98 parts part by weight of artificial graphite, 1 part by weight of styrene butadiene rubber, and 1 part by weight of carboxylmethyl cellulose were dispersed into N-methyl-2-pyrrolidone, forming a slurry. Subsequently, the slurry was coated on an aluminum foil current collector and dried to form a negative active material layer, manufacturing a negative electrode.

In addition, a porous polyethylene film as a separator (having a thickness of 12 μm) was interposed between the positive and negative electrodes, manufacturing an electrode structure, and the electrode structure was inserted into a battery case. An electrolyte was prepared by mixing ethylene carbonate (EC), dimethyl carbonate (DMC) and ethyl methyl carbonate (EMC) to a volume ratio of 30:40:30 to form a mixed solvent and dissolving lithium hexafluoro phosphate ($LiPF_6$) to a concentration of 1.0 mol/L in the mixed solvent to form an electrolyte solution. In addition, a compound represented by Chemical Formula 1a (compound 11) and vinylene carbonate as an additive were added to the electrolyte solution. The compound 11 was included in an amount of 0.5 wt %, and the vinylene carbonate was included in an amount of 1 wt % based on the total weight of the electrolyte solution (i.e., the total weight of the solvent, the $LiPF_6$ and the additives).

Next, the resultant electrolyte solution was added so that the pores in the separator might be impregnated with the electrolyte solution. In this way, the rechargeable lithium ion battery cell according to Example 1 was manufactured.

Examples 2 to 18 and Comparative Examples 1 to 12

Each rechargeable lithium ion battery cell according to Examples 2 to 18 and Comparative Examples 1 to 12 was manufactured as described with respect to Example 1, except that additives of Examples 2 to 18 and Comparative Examples 1 to 12 had different compositions than that of Example 1 and/or were included at different concentrations. The compounds added as an additive to Examples 2 to 18 and Comparative Examples 1 to 12 and their respective concentrations are provided in Tables 1 and 2.

In Tables 1 and 2, the symbol [VC] indicates vinylene carbonate, and the symbol [VEC] indicates vinylethylene carbonate. In addition, the symbol [-] indicates that no additives were added.

Examples 19 to 23 and Comparative Examples 13 to 17

The rechargeable lithium ion battery cell according to Example 19 was manufactured as described with respect to Example 1, except that the rechargeable lithium ion battery cell according to Example 19 included $LiNi_{0.5}Co_{0.2}Mn_{0.3}O_2$ as the positive active material instead of the $LiNi_{0.6}Co_{0.2}Mn_{0.2}O_2$ of Example 1. In addition, Examples 20 to 23 and Comparative Examples 13 to 17 were manufactured as described with respect to Example 19, except that additives of Examples 20 to 23 and Comparative Examples 13 to 17 respectively had different compositions than that of Example 19 and/or were included at different concentrations. The compounds of the additives of Examples 20 to 23 and Comparative Examples 13 to 17 and their respective concentrations are provided in Table 3. Herein, the symbols [VC], [VEC] and [-] in Table 3 are the same as those in Tables 1 and 2.

Examples 24 to 26 and Comparative Examples 18 to 20

The rechargeable lithium ion battery cell according to Example 24 was manufactured as described with respect to Example 1, except that the rechargeable lithium ion battery cell according to Example 24 included $LiNi_{0.8}Co_{0.1}Mn_{0.1}O_2$ instead of the $LiNi_{0.6}Co_{0.2}Mn_{0.2}O_2$ of Example 1 as the positive active material. In addition, the rechargeable lithium ion battery cells according to Examples 25 and 26 and Comparative Examples 18 to 20 were manufactured as described with respect to Example 24, except that additives of Examples 25 and 26 and Comparative Examples 18 to 20 respectively had different compositions than that of Example 24 and/or were included at different concentrations. The compounds added as the additives of Examples 25 and 26 and Comparative Examples 18 to 20 and their respective concentrations are provided in Table 4. Herein, the symbols [VC], [VEC] and [-] in Table 4 are the same as those in Tables 1 and 2.

Storage at High Temperature

Subsequently, the rechargeable lithium ion battery cells according to Examples 1 to 26 and Comparative Examples 1 to 20 were storage-tested at a high temperature. Specifically, the rechargeable lithium ion battery cells were CC-CV charged (constant current-constant voltage charged) until their respective battery voltage became 4.2 V and then, were allowed to stand at 60° C. for 60 days after the full-charge. In addition, DC resistance, capacity, and volume of the rechargeable lithium ion battery cells before and after being allowed to stand were measured to calculate a DC resistance increase ratio, recovery capacity (i.e., capacity retention before and after being allowed to stand) and a gas generation amount (i.e., a volume increase ratio before and after being allowed to stand) due to storage at the high temperature.

Herein, the DC resistance increase ratio was obtained by dividing the increased DC resistance after being allowed to stand by the DC resistance before being allowed to stand. In addition, the recovery capacity was obtained by dividing the capacity of the rechargeable lithium ion battery cell after being allowed to stand by its capacity before being allowed to stand. In addition, the gas generation amount was obtained by dividing the amount of volume increase of the rechargeable lithium ion battery cell after being allowed to stand by capacity and converting the result into a unit capacity.

The DC resistance was obtained from an internal resistance (IR) drop. The IR drop was measured by discharging the rechargeable lithium ion battery cell at 1 C, 2 C, 3 C and 6 C from a 50% charged state. In addition, the capacity of the rechargeable lithium ion battery cell was obtained by CC-CV charging (constant current constant voltage charging) it at 0.5 C until the battery voltage became 4.2 V and then, CC discharging (constant current discharging) it at 0.2 C until the battery voltage became 2.8 V. Furthermore, the volume of the rechargeable lithium ion battery cell was measured using Archimedes method.

The storage test results at the high temperature are provided in Tables 1 to 4. Tables 1 and 2 show the results of the rechargeable lithium ion battery cells including $LiNi_{0.6}Co_{0.2}Mn_{0.2}O_2$ as a positive active material, Table 3 shows the result of the rechargeable lithium ion battery cells including $LiNi_{0.5}Co_{0.2}Mn_{0.3}O_2$ as a positive active material, and Table 4 shows the result of the rechargeable lithium ion battery cells including $LiNi_{0.8}Co_{0.1}Mn_{0.1}O_2$ as a positive active material.

Table 1 shows the evaluation results of Examples 1 to 9 and Comparative Examples 1 to 8, which included at least one of a first to third additive.

In Table 1, VC refers to vinylene carbonate and VEC refers to vinyl ethylene carbonate.

Referring to Table 1, Examples 1 to 9 showed lower DC resistance increase ratio and smaller gas generation amount and concurrently or simultaneously, larger increased recovery capacity than Comparative Examples 1 to 8. Accordingly, Examples 1 to 9 including embodiments of the first and second additives disclosed herein showed improved thermal stability and battery characteristics when stored at a high temperature. In addition, Examples 2, 3, 5 and 7 including the compound 31 as the third additive showed much lower deterioration of DC resistance and much lower gas generation amount and concurrently or simultaneously, increased recovery capacity compared with Examples 1, 4, 8 and 9, which did not include compound 31. Accordingly, Examples 2, 3, 5 and 7 including the compound 31 as the third additive showed further improved thermal stability and battery characteristics when stored at a high temperature.

On the other hand, Comparative Examples 1 to 6, which included the first additive but not the second additive, showed deteriorated recovery capacity and also, extremely increased gas generation amount as compared to Examples 1 to 9. In addition, Comparative Examples 7 and 8, which included the second additive but not the first additive, showed increased DC resistance increase ratio and gas generation amount as compared to Examples 1 to 9. Accordingly, Comparative Examples 1 to 8 showed deteriorated thermal stability and battery characteristics when stored at a high temperature.

Next, Table 2 shows the evaluation results of Examples 18 to 20 and Comparative Examples 9 to 12 by respectively changing the concentration of the first to third additives.

TABLE 1

|  | First additive [0.5 wt %] | Second additive [1 wt %] | Third additive [2 wt %] | Increase ratio of DC resistance | Recovery capacity | Gas generation [$cm^3$/mAh] |
|---|---|---|---|---|---|---|
| Example 1 | Compound 11 | VC | — | 35% | 85 | 4.1 |
| Example 2 | Compound 11 | VC | compound 31 | 25% | 86 | 0.9 |
| Example 3 | Compound 11 | VEC | compound 31 | 26% | 85 | 0.9 |
| Example 4 | Compound 12 | VC | — | 35% | 84 | 4.8 |
| Example 5 | Compound 12 | VC | compound 31 | 29% | 85 | 2.4 |
| Example 6 | Compound 21 | VC | — | 38% | 85 | 4.5 |
| Example 7 | Compound 21 | VC | compound 31 | 30% | 85 | 3.6 |
| Example 8 | Compound 22 | VC | — | 36% | 84 | 3.9 |
| Example 9 | Compound 23 | VC | — | 39% | 84 | 5.5 |
| Comparative Example 1 | Compound 11 | — | — | 37% | 79 | 50 |
| Comparative Example 2 | Compound 12 | — | — | 39% | 78 | 45 |
| Comparative Example 3 | Compound 21 | — | — | 38% | 78 | 48 |
| Comparative Example 4 | Compound 22 | — | — | 40% | 79 | 47 |
| Comparative Example 5 | Compound 23 | — | — | 39% | 78 | 49 |
| Comparative Example 6 | Compound 24 | — | — | 41% | 77 | 47 |
| Comparative Example 7 | — | VC | — | 62% | 82 | 9.4 |
| Comparative Example 8 | — | VEC | — | 64% | 81 | 10 |

TABLE 2

|  | Compound 11 Concentration [wt %] | VC concentration [wt %] | Concentration of compound 31 [wt %] | Increase ratio of DC resistance | Recovery capacity | Gas generation [cm³/mAh] |
| --- | --- | --- | --- | --- | --- | --- |
| Example 10 | 0.05 | 1.0 | — | 36% | 84 | 5.9 |
| Example 11 | 0.1 |  |  | 35% | 84 | 5.6 |
| Example 12 | 0.5 |  |  | 35% | 85 | 4.1 |
| Example 13 | 0.1 | 0.2 |  | 33% | 83 | 5.7 |
| Example 14 |  | 0.5 |  | 34% | 85 | 5.5 |
| Example 15 |  | 1.5 |  | 36% | 86 | 6.1 |
| Example 16 | 0.1 | 1.0 | 0.5 | 29% | 85 | 1.2 |
| Example 17 |  |  | 1.0 | 26% | 86 | 0.9 |
| Example 18 |  |  | 2.0 | 25% | 85 | 0.9 |
| Comparative Example 9 | 0.01 | 1.0 | — | 48% | 82 | 9.8 |
| Comparative Example 10 | 1.0 |  |  | 36% | 82 | 15 |
| Comparative Example 11 | 0.1 | 0.1 |  | 38% | 78 | 43 |
| Comparative Example 12 |  | 2.0 |  | 59% | 82 | 11 |

Referring to Table 2, Examples 18 to 20 included the first additive of a compound (11) and the second additive of VC within the concentration ranges of the present invention and thus, showed deteriorated or reduced gas generation amount and concurrently or simultaneously, increased recovery capacity. Accordingly, Examples 18 to 20 showed improved thermal stability and battery characteristics when stored at a high temperature.

In addition, Examples 16 to 18 included the third additive of a compound (31) in a range of 0.5 wt % to 2.0 wt % and showed a further reduction of the increase ratio of DC resistance and low gas generation amount and concurrently or simultaneously, increased recovery capacity as compared to Example 11. Accordingly, Examples 16 to 18 showed further improved thermal stability and battery characteristics when stored at high temperature.

On the other hand, Comparative Examples 9 and 10 included the compound 11 of the first additive in amounts outside of the concentration range of embodiments of the present invention and thus, showed an increased gas generation amount. Accordingly, Comparative Examples 9 and 10 showed deteriorated thermal stability when stored at a high temperature. In addition, Comparative Examples 11 and 12 included the VC of the second additive in amounts outside of the concentration range of embodiments of the present invention and thus, showed an increase in the increase ratio of DC resistance and gas generation amount and concurrently or simultaneously, decreased recovery capacity. Accordingly, Comparative Examples 11 and 12 showed deteriorated or reduced thermal stability and battery characteristics when stored at a high temperature.

In addition, Table 3 shows the evaluation results of Examples 19 to 23 and Comparative Examples 13 to 17 using $LiNi_{0.5}Co_{0.2}Mn_{0.3}O_2$ as a positive active material.

TABLE 3

|  | First additive [0.5 wt %] | Second additive [1 wt %] | Third additive [2 wt %] | Increase ratio of DC resistance | Recovery capacity | Gas generation [cm³/mAh] |
| --- | --- | --- | --- | --- | --- | --- |
| Example 19 | Compound 11 | VC | — | 27% | 88% | 0.9 |
| Example 20 | Compound 11 | VC | Compound 31 | 22% | 89% | 0.4 |
| Example 21 | Compound 11 | VEC | Compound 31 | 21% | 89% | 0.5 |
| Example 22 | Compound 12 | VC | — | 27% | 88% | 0.8 |
| Example 23 | Compound 21 | VC | — | 26% | 88% | 0.9 |
| Comparative Example 13 | Compound 11 | — | — | 29% | 81% | 9.1 |
| Comparative Example 14 | Compound 12 | — | — | 29% | 81% | 8.9 |
| Comparative Example 15 | Compound 21 | — | — | 28% | 82% | 8.7 |
| Comparative Example 16 | — | VC | — | 63% | 86% | 2.6 |
| Comparative Example 17 | — | VEC | — | 61% | 85% | 2.7 |

Referring to Table 3, Examples 19 to 23 showed deteriorated or reduced increase ratio of DC resistance and gas generation amount and concurrently or simultaneously, increased recovery capacity as compared to Comparative Examples 13 to 17. Accordingly, Example 19 to 23 including the first and second additives showed improved thermal stability and battery characteristics when stored at a high temperature. In addition, Examples 20 and 21, which further included the compound 31, showed a further decrease in the increase ratio of DC resistance and low gas generation amount as compared to Examples 19, 22, and 23, which did not include compound 31. Accordingly, Examples 20 and 21, which included the third additive of the compound 31, showed much improved thermal stability and battery characteristics when stored at a high temperature.

On the other hand, Comparative Examples 14 and 15, which included the first additive but not the second additive, showed deteriorated recovery capacity and increased gas generation amount as compared to Examples 19 to 23. In addition, Comparative Examples 16 and 17, which included the second additive but not the first additive, showed an increase in the increase ratio of DC resistance and gas generation amount as compared to Examples 19 to 23. Accordingly, Comparative Examples 14 to 17 showed deteriorated thermal stability and battery characteristics when stored at a high temperature.

In addition, Table 4 shows the evaluation results of Examples 24 to 26 and Comparative Examples 18 to 20, which included $LiNi_{0.8}Co_{0.1}Mn_{0.1}O_2$ as a positive active material.

TABLE 4

| | First additive [0.5 wt %] | Second additive [1 wt %] | Third additive [2 wt %] | Increase ratio of DC resistance | Recovery capacity | Gas generation [cm$^3$/mAh] |
|---|---|---|---|---|---|---|
| Example 24 | Compound 11 | VC | — | 35% | 84% | 4.2 |
| Example 25 | Compound 11 | VC | compound 31 | 28% | 85% | 0.9 |
| Example 26 | Compound 21 | VC | — | 36% | 83% | 4.1 |
| Comparative Example 18 | Compound 11 | — | — | 46% | 73% | 42 |
| Comparative Example 19 | Compound 21 | — | — | 45% | 72% | 46 |
| Comparative Example 20 | — | VC | — | 68% | 79% | 13 |

Referring to Table 4, Examples 24 to 26 showed a decrease in the increase ratio of DC resistance and gas generation amount and concurrently or simultaneously increased recovery capacity as compared to Comparative Examples 18 to 20. Accordingly, Examples 24 to 26, which included the first and second additives, showed improved thermal stability and battery characteristics when stored at high temperature. In addition, Example 25, which included the compound 31 of the third additive, showed a further decrease in the increase ratio of DC resistance and low gas generation amount as compared to Examples 24 and 26. Accordingly, Example 24, which included the compound 31 of the third additive, showed much improved thermal stability and battery characteristics when stored at a high temperature.

On other hand, Comparative Examples 18 and 19, which included the first additive but not the second additive, showed an increase in the increase ratio of DC resistance gas generation amount and deteriorated recovery capacity as compared to Examples 24 to 26. In addition, Comparative Example 20, which included the second additive but not the first additive, showed an increase in the increase ratio of DC resistance and gas generation amount as compared to Examples 24 to 26. Accordingly, Comparative Examples 18 to 20 showed deteriorated thermal stability and battery characteristics when stored at a high temperature.

Referring to the evaluation results of Tables 3 and 4, the rechargeable lithium ion battery cell according to an exemplary embodiment used a lithium nickel composite oxide having a suitable composition and showed improved thermal stability and battery characteristics when stored at a high temperature, similarly to the results shown in Tables 1 and 2.

As shown in the above evaluation results, an exemplary embodiment may improve thermal stability and battery characteristics of a rechargeable lithium ion battery cell when stored at a high temperature.

In addition, the thermal stability and battery characteristics of the rechargeable lithium ion battery cell when stored at a high temperature may be further improved by adding imide lithium salt to a non-aqueous electrolyte according to another exemplary embodiment.

Furthermore, the electrolyte according to an exemplary embodiment may be suitably used for a rechargeable lithium ion battery cell using a lithium nickel composite oxide including a relatively high Ni ratio as a positive active material.

As described above, referring to the accompanying drawing, certain embodiments of the present invention are described, but the present invention is not limited thereto. While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium ion battery comprising:
    a positive active material comprising a lithium compound; and
    a non-aqueous electrolyte comprising:
        at least one disulfonate ester selected from a cyclic disulfonate ester represented by Chemical Formula 1 and a linear disulfonate ester represented by Chemical Formula 2, and
        at least one carbonate having an unsaturated bond selected from vinylene carbonate and vinylethylene carbonate:

Chemical Formula 1

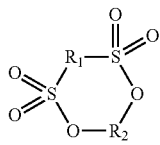

wherein, in Chemical Formula 1,
R₁ and R₂ are each independently selected from a substituted or unsubstituted C1 to C5 alkylene group and a substituted or unsubstituted C1 to C5 fluoro alkylene group, Chemical Formula 2

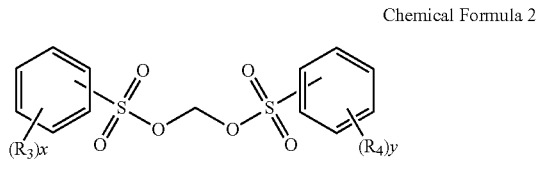

wherein, in Chemical Formula 2,
R₃ and R₄ are each independently selected from a substituted or unsubstituted C1 to C4 alkyl group and a substituted or unsubstituted C1 to C4 fluoro alkyl group,
x and y are each independently integers of 0 to 5,
wherein the non-aqueous electrolyte comprises about 0.05 wt % to about 0.5 wt % of the disulfonate ester based on the total weight of the non-aqueous electrolyte, and about 0.2 wt % to about 1.5 wt % of the carbonate having the unsaturated bond based on the total weight of the non-aqueous electrolyte, and
wherein the non-aqueous electrolyte further comprises an imide lithium salt included in an amount of about 0.5 wt % to about 2.0 wt % based on the total weight of the non-aqueous electrolyte and represented by Chemical Formula 3:

Chemical Formula 3

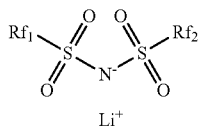

wherein, in Chemical Formula 3,
Rf₁ and Rf₂ are each independently selected from fluorine and a C1 to C4 fluoro alkyl group.

2. The rechargeable lithium ion battery of claim 1, wherein, in Chemical Formulae 1 and 2,
R₁ and R₂ are each independently a substituted or unsubstituted C1 to C2 alkylene group,
R₃ and R₄ are each independently selected from a substituted or unsubstituted methyl group and a substituted or unsubstituted fluoro methyl group, and
x and y are each independently integers of 1 to 3.

3. The rechargeable lithium ion battery of claim 1, wherein, in Chemical Formula 3, Rf₁ and Rf₂ are each fluorine.

4. The rechargeable lithium ion battery of claim 1, wherein the lithium compound is represented by Chemical Formula 4:

$Li_aX_bY_{1-b}O_2$        Chemical Formula 4 wherein, in Chemical Formula 4,
X is selected from Ni, Co, Mn, and a combination thereof,
Y is selected from Al, Ni, Co, Mn, Cr, Fe, Mg, Sr, V, a rare earth element and a combination thereof, and 0.90≤a≤1.8 and 0≤b≤0.9.

5. The rechargeable lithium ion battery of claim 4, wherein the lithium compound is represented by Chemical Formula 5:

$Li_aNi_bM_{1-b}O_2$        Chemical Formula 5 wherein, in Chemical Formula 5,
M is selected from Co, Mn, and a combination thereof, and 0.90≤a≤51.8 and 0≤b≤0.9.

6. A rechargeable lithium ion battery comprising:
a positive active material comprising a lithium compound; and
a non-aqueous electrolyte comprising:
at least one linear disulfonate ester represented by Chemical Formula 2, and
at least one carbonate having an unsaturated bond selected from vinylene carbonate and vinylethylene carbonate:

Chemical Formula 2

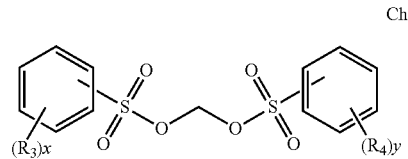

wherein, in Chemical Formula 2,
R₃ and R₄ are each independently selected from a substituted or unsubstituted C1 to C4 alkyl group, and
x and y are each independently integers of 4 or 5,
wherein the substituted C1 to C4 alkyl group is substituted with a substituent selected from a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof, in place of a hydrogen atom,
wherein the non-aqueous electrolyte comprises about 0.05 wt % to about 0.5 wt % of the linear disulfonate ester based on the total weight of the non-aqueous electrolyte, and about 0.2 wt % to about 1.5 wt % of the carbonate having the unsaturated bond based on the total weight of the non-aqueous electrolyte, and
wherein the non-aqueous electrolyte further comprises an imide lithium salt included in an amount of about 0.5 wt % to about 2.0 wt % based on the total weight of the non-aqueous electrolyte and represented by Chemical Formula 3:

Chemical Formula 3

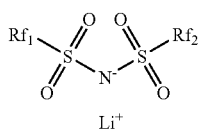

wherein, in Chemical Formula 3,
Rf$_1$ and Rf$_2$ are each independently selected from fluorine and a C1 to C4 fluoro alkyl group.

7. A rechargeable lithium ion battery comprising:
a positive active material comprising a lithium compound; and
a non-aqueous electrolyte comprising:
at least one disulfonate ester selected from Compound 11, Compound 12, Compound 21, Compound 22, Compound 23, and Compound 24, and
at least one carbonate having an unsaturated bond selected from vinylene carbonate and vinylethylene carbonate:

Compound 11

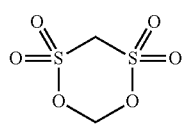

Compound 12

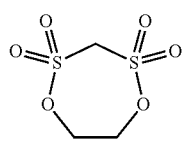

Compound 21

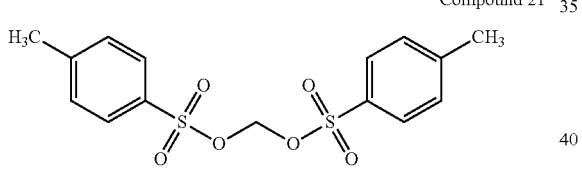

Compound 22

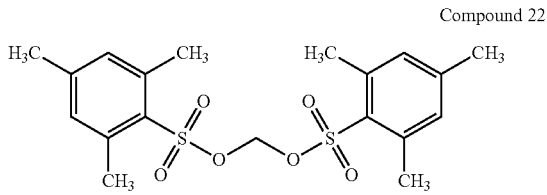

Compound 23

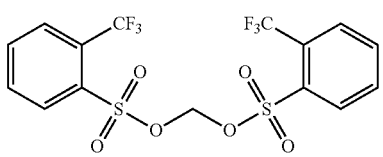

Compound 24

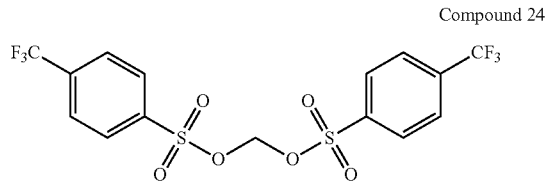

wherein the non-aqueous electrolyte comprises about 0.05 wt % to about 0.5 wt % of the disulfonate ester based on the total weight of the non-aqueous electrolyte, and about 0.2 wt % to about 1.5 wt % of the carbonate having the unsaturated bond based on the total weight of the non-aqueous electrolyte, and wherein the non-aqueous electrolyte further comprises an imide lithium salt included in an amount of about 0.5 wt % to about 2.0 wt % based on the total weight of the non-aqueous electrolyte and represented by Chemical Formula 3:

Chemical Formula 3

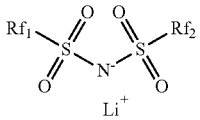

wherein, in Chemical Formula 3,
Rf$_1$ and Rf$_2$ are each independently selected from fluorine and a C1 to C4 fluoro alkyl group.

8. The rechargeable lithium battery of claim 7, wherein the non-aqueous electrolyte comprises Compound 11.

* * * * *